June 8, 1965   P. C. NETZEL   3,188,413
EXPANDABLE SWITCHGEAR HOUSING FOR DRAWOUT ELECTRIC APPARATUS
Filed Nov. 27, 1961   5 Sheets-Sheet 1
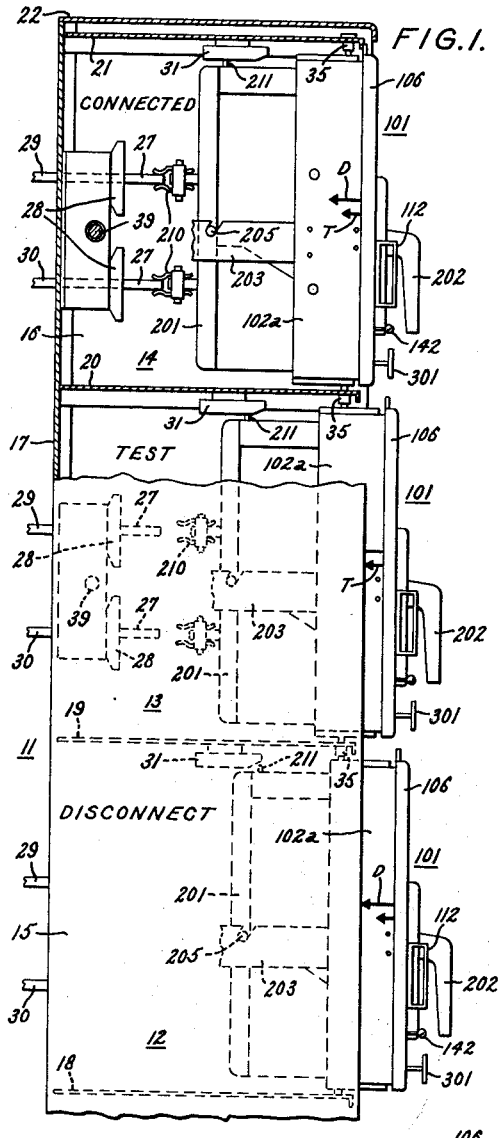
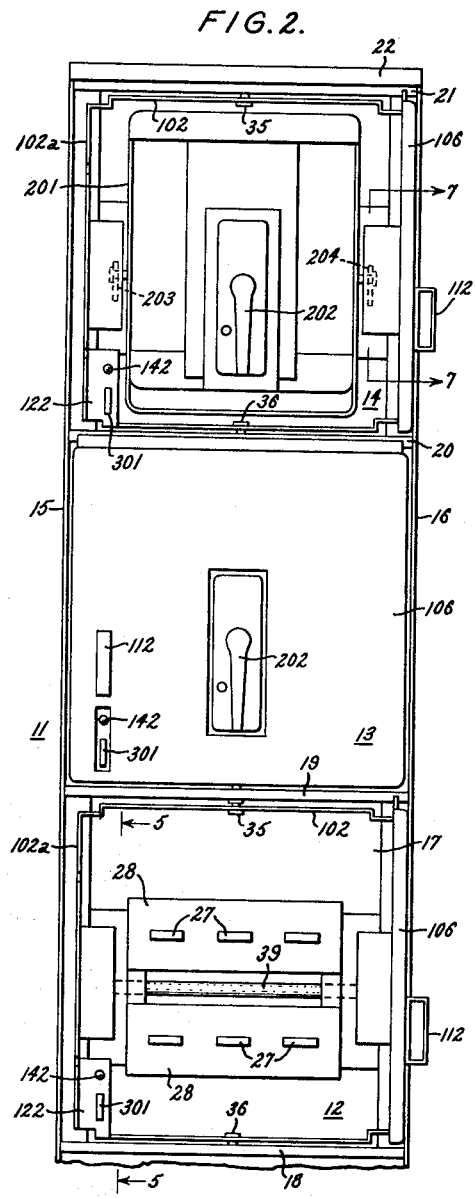
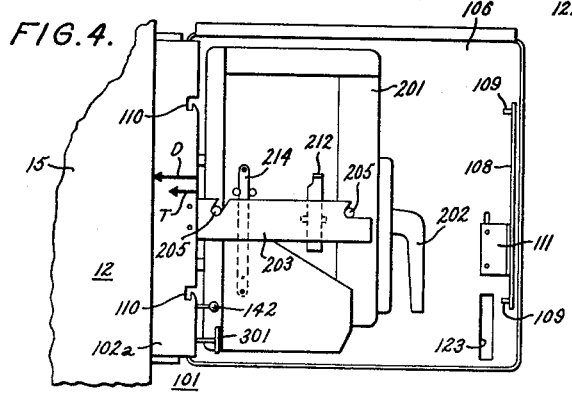
INVENTOR:
PHILIP C. NETZEL,
BY Albert S. Richardson Jr.
ATTORNEY.

June 8, 1965  P. C. NETZEL  3,188,413
EXPANDABLE SWITCHGEAR HOUSING FOR DRAWOUT ELECTRIC APPARATUS
Filed Nov. 27, 1961  5 Sheets-Sheet 2
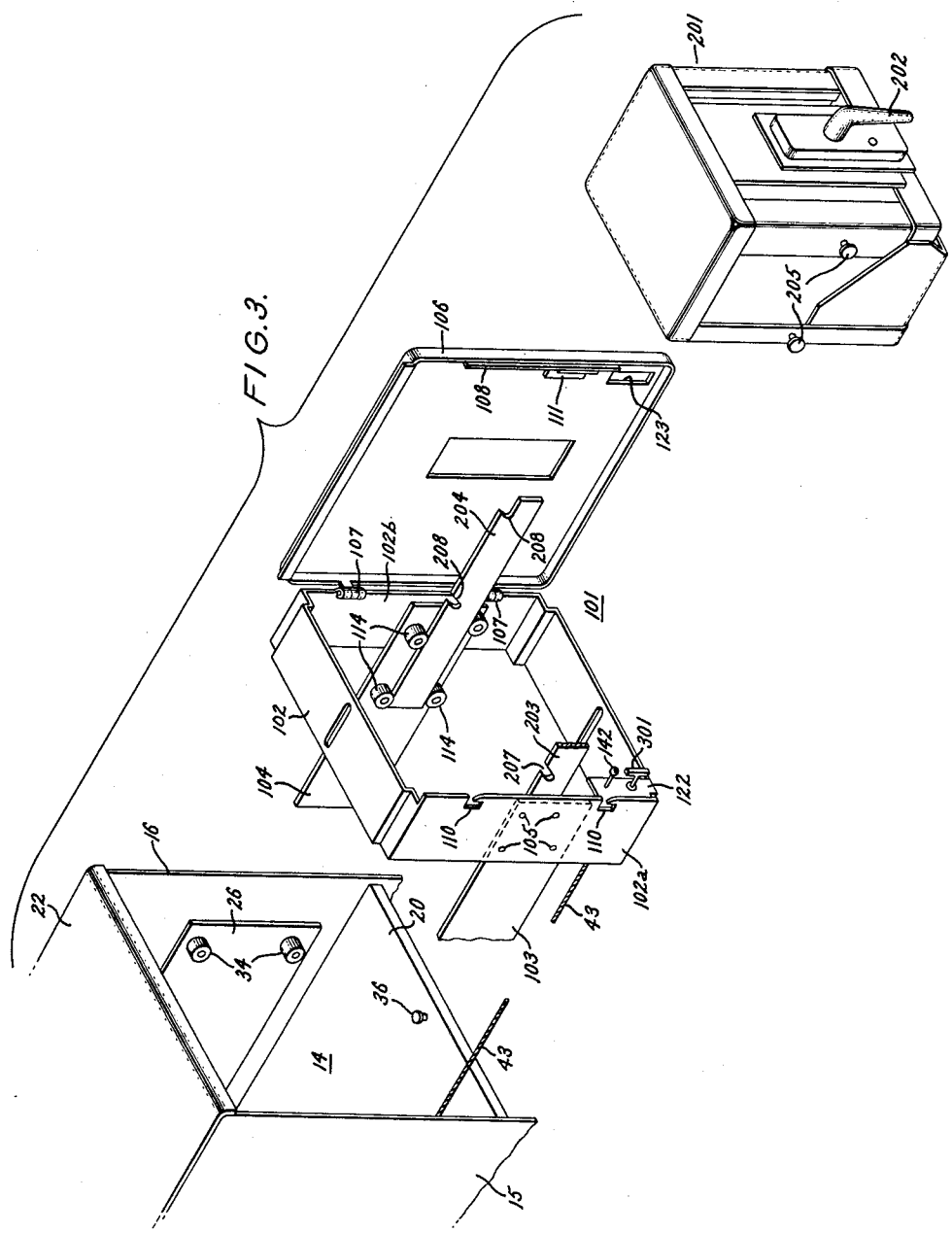
INVENTOR:
PHILIP C. NETZEL,
BY Albert S. Richardson Jr.
ATTORNEY.

June 8, 1965 P. C. NETZEL 3,188,413
EXPANDABLE SWITCHGEAR HOUSING FOR DRAWOUT ELECTRIC APPARATUS
Filed Nov. 27, 1961 5 Sheets-Sheet 3
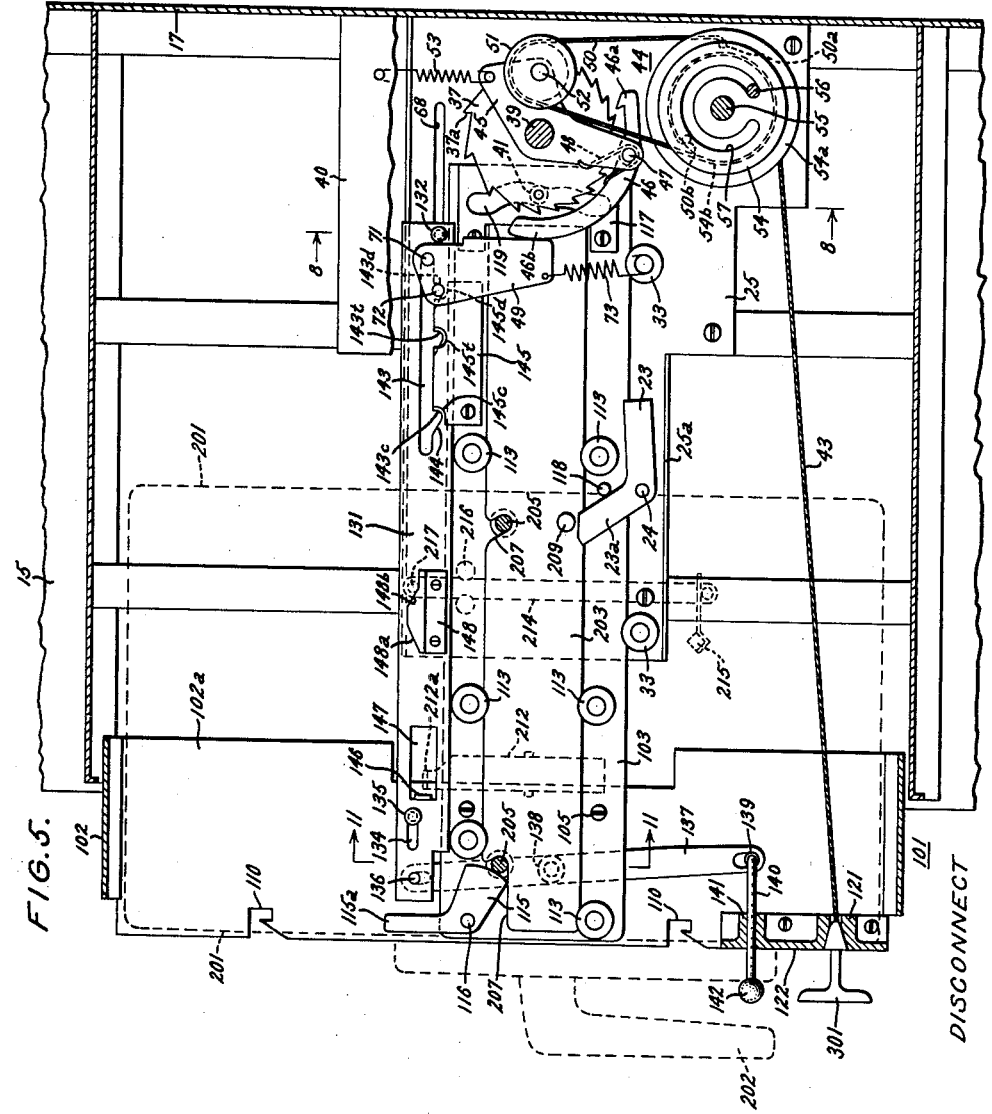
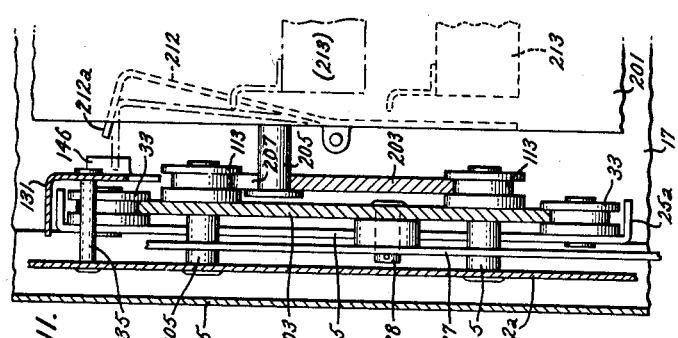
INVENTOR:
PHILIP C. NETZEL,
BY Albert S. Richardson Jr.
ATTORNEY.

June 8, 1965  P. C. NETZEL  3,188,413
EXPANDABLE SWITCHGEAR HOUSING FOR DRAWOUT ELECTRIC APPARATUS
Filed Nov. 27, 1961  5 Sheets-Sheet 4
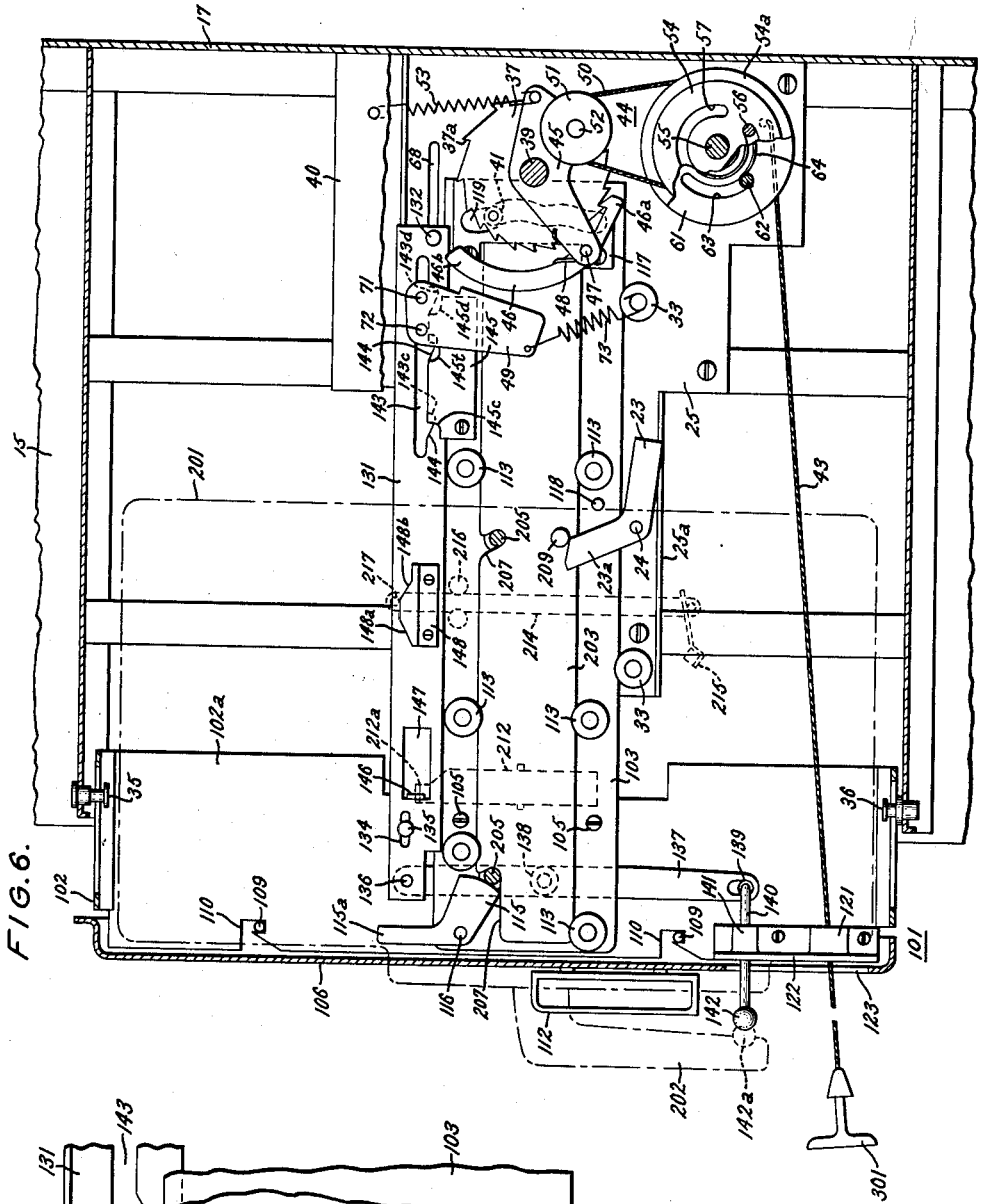
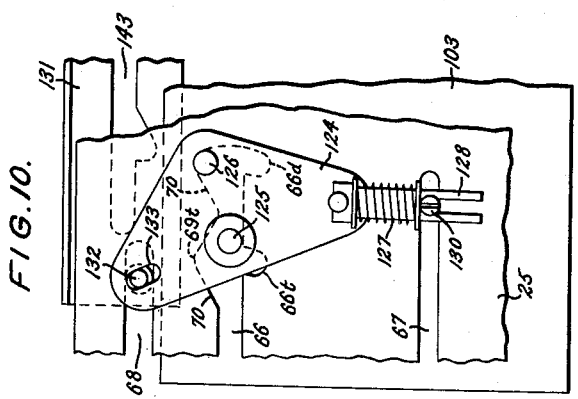
INVENTOR:
PHILIP C. NETZEL,
BY Albert S. Richardson Jr.
ATTORNEY.

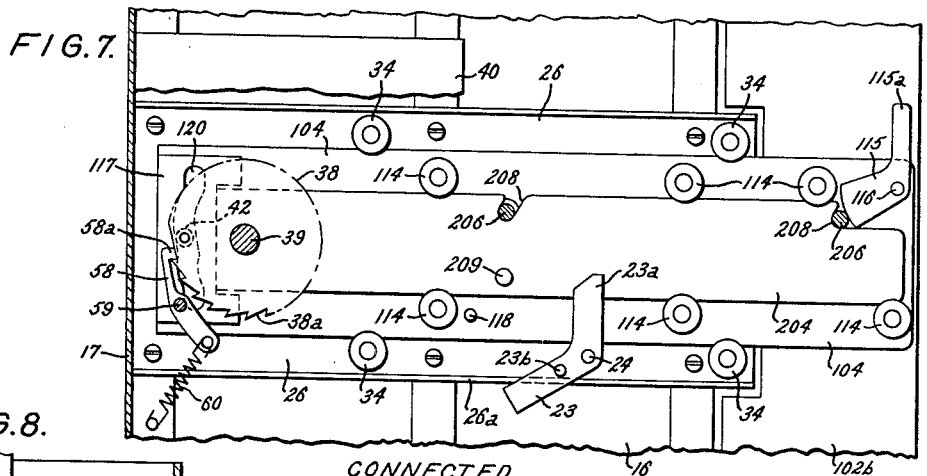
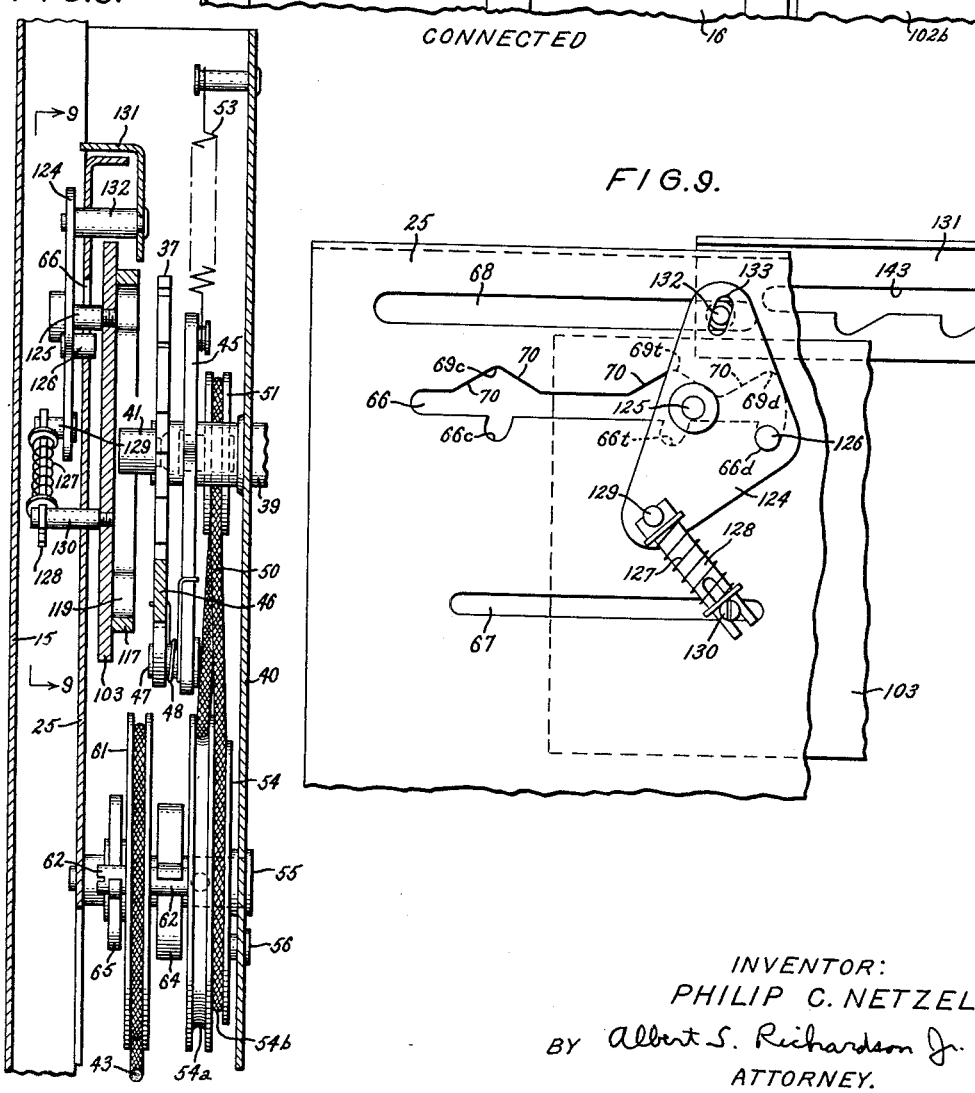

United States Patent Office 3,188,413
Patented June 8, 1965

3,188,413
EXPANDABLE SWITCHGEAR HOUSING FOR DRAWOUT ELECTRIC APPARATUS
Philip C. Netzel, Swarthmore, Pa., assignor to General Electric Company, a corporation of New York
Filed Nov. 27, 1961, Ser. No. 154,960
13 Claims. (Cl. 200—50)

This invention relates to a housing for drawout electric apparatus, and more particularly it relates to the structure of an expandable switchgear housing for safely and conveniently enclosing a removable electric circuit interrupter or the like.

In the electric power switchgear art, it is customary practice to house removable circuit breaker units in individual cells or compartments of a grounded sheet-metal enclosure. The current-conducting parts of the circuit breaker are connected for energization to associated supply and load circuits by means of cooperating, separable "disconnect" members, with suitable means being provided for racking the breaker unit to and from its connected or fully inserted position within the compartment. Thus the breaker unit can be readily withdrawn from its housing for repair or maintenance purposes.

For reasons of safety, such equipment conventionally is of "dead-front" construction; each breaker compartment has a metal door or access panel to protect operating personnel from accidental contact with the energized or "live" apparatus which is inside the compartment and to confine the dangerous hot gasses which may be produced in the compartment upon operation of the apparatus. In order manually to close the circuit interrupting contacts of the enclosed breaker, there is commonly provided an insulated operating handle conveniently accessible from outside the enclosure with the compartment door closed.

In operating and maintaining the above-described equipment, it is sometimes necessary to disconnect or deenergize one or more of the circuit breakers without removing it from the enclosure. For this reason, one of the general objectives of switchgear designers in recent years has been to provide suitable means whereby the circuit breaker unit can be stored inside its compartment (with the compartment door closed) when the disconnect members are separated and hence the breaker deenergized.

One of the prior art techniques for enabling a breaker unit to be safely stored within its housing when disconnected utilizes an oversized compartment, whereby ample room is available for moving the breaker unit wholly within its compartment from connected to disconnected positions. While functionally satisfactory, such a technique has the disadvantage of requiring a larger housing which takes up more space than is otherwise needed for proper construction and operation of such equipment. It is additionally disadvantageous because, in order to operate the circuit breaker when connected, either a special telescopic coupling between the breaker and its manual operating handle is required, or the circuit breaker unit must have a special, elongated escutcheon. Further, a special face plate may be needed in conjunction with the compartment door and the breaker escutcheon in order to preserve the shielding function of the door while still enabling it to be opened without obstruction when the breaker unit is disconnected.

Another technique in the prior art is that of using a "reversible" access panel having a concave cross section, whereby the panel can be reversed with its concavity protruding outwardly in order to enclose a partially withdrawn, disconnected breaker unit. Still another solution to this problem has been the provision of extensible hinges for the compartment door, thereby permitting the door to swing into a plane spaced from but parallel to the front of the compartment when the circuit breaker unit is in its disconnected position. The present invention is believed to be an improvement over all of these older techniques.

It is a general object of my invention to provide a housing for electric apparatus and the like having improved features of safety and convenience.

It is another object of my invention to provide an improved housing, including an openable access cover, for enclosing removable electric apparatus, the housing being designed to conserve space while enabling the apparatus to be withdrawn from a fully inserted position inside the housing without opening the access cover.

Still another object of my invention is the provision, for enclosing a removable circuit breaker unit or the like, of a housing which expands upon movement of the enclosed unit from connected to disconnected positions and which preserves a complete enclosure of the unit when in its disconnected position.

It is yet a different object of my invention to provide an improved housing adapted to enclose withdrawable circuit interrupters of more than one manufacture, the housing including integral racking means for moving the interrupter from a fully inserted position within the housing to a partially withdrawn position in which the interrupter is still enclosed.

Another object of the present invention is the provision, in a housing for electric apparatus which can be moved between preselected positions, of an improved mode of releasably restraining the apparatus in each of its respective positions.

In carrying out my invention in one form, in order to enclose a circuit interrupter or the like, I provide a stationary housing which includes a telescopic inner part disposed for movement between a retracted position and a position of protrusion with respect to the housing. The inner part includes a collar-like portion which maintains the integrity of the enclosure when protruding. An openable access cover for the housing is attached to the aforesaid inner part; hence the cover and the inner part travel in concert. By moving the inner part from its retracted position within the housing (wherein the access cover is substantially flush with the housing front, and there is practically no wasted space inside the housing) to its telescopically extended or protruding position partially without the housing, the circuit interrupter which the housing accommodates can be stored in a fully disconnected yet completely enclosed disposition.

In one aspect of my invention the above-described housing includes an integral racking mechanism for moving its inner part, and the inner part is adapted removably to support the circuit interrupter to be enclosed. With this arrangement the circuit interrupter need not be equipped with any special racking provision; hence circuit interrupters of different manufacture can readily be accommodated. The racking mechanism which moves the inner part of the housing preferably includes an actuating handle disposed for manual operation from outside the housing while the access cover remains closed. The cover can be opened when the inner part is in its protruding position in order to inspect or remove the enclosed circuit interrupter.

In another aspect of the invention, the housing includes position stop means which operates to block movement of the aforesaid inner part and simultaneously to disable the racking mechanism when the inner part reaches each of its respective positions. By disabling the racking mechanism in this manner, damage to both the stop means and the racking mechanism is avoided should an operator improperly attempt to operate the racking mechanism before resetting the stop means to a non-blocking disposition. A manually operative reset member is provided for effecting reset of the stop means whenever futrher movement of the inner part is desired.

My invention will be better understood and its various objects and advantages will be more fully appreciated from the following description taken in conjunction with the accompanying drawings in which:

FIG. 1 is a side elevational view, partly broken away of a 3-compartment enclosure for removable electric circuit breakers, with the respective circuit breakers being shown in three different positions in order to illustrate a preferred embodiment of my invention;

FIG. 2 is a front elevational view of the enclosure of FIG. 1, with the doors of the upper and lower compartments open and with the circuit breaker removed from the lower compartment;

FIG. 3 is a simplified exploded perspective view of a compartment, constructed in accordance with my invention, for housing a circuit breaker;

FIG. 4 is a partial side elevational view of the lower compartment shown in FIG. 1, with the circuit breaker fully withdrawn therefrom;

FIG. 5 is an enlarged sectional view of the lower breaker compartment taken along lines 5—5 of FIG. 2;

FIG. 6 is an enlarged sectional view similar to FIG. 5 showing the breaker compartment in a different disposition;

FIG. 7 is an enlarged sectional view of the upper breaker compartment taken along lines 7—7 of FIG. 2;

FIG. 8 is an enlarged sectional view of the compartment racking mechanism taken along lines 8—8 of FIG. 5;

FIG. 9 is a sectional view of position stop means taken along lines 9—9 of FIG. 8;

FIG. 10 is a view similar to that of FIGURE 9 with the position stop means in a different disposition; and FIG. 11 is an enlarged sectional view of the breaker compartment taken along lines 11—11 of FIG. 5.

Referring now to FIGS. 1 and 2, there is shown a stationary sheet-metal enclosure 11 for electric apparatus comprising three vertically stacked individual compartments or housings 12, 13 and 14. A pair of upstanding metal side sheets 15 and 16 and a vertically disposed rear barrier 17 form three sides of each of the generally cubic compartments 12–14. Horizontal plates or barriers 18, 19 and 20 provide bottom closures for the respective compartments. The top closure of compartment 12 is provided by the barrier 19; the top closure of compartment 13 is provided by the barrier 20; and the top closure of compartment 14 is provided by still another horizontally disposed metal barrier 21. Each of the compartments has an opening at its front. The enclosure 11 is topped by a trim plate 22 as shown.

In accordance with my invention, each compartment or housing comprising the enclosure 11 includes between its sidewalls a retractable inner part 101. Since this inner part as illustrated is identical in all three compartments, the same reference numeral 101 has been used to identify it in each instance. The inner part 101 in simplified form is best seen in FIG. 3 which is an exploded perspective view of the compartment 14. It comprises a short metal collar 102, disposed telescopically to fit into the rectangular opening of the associated compartment, and a pair of parallel, elongated supporting members or runners 103 and 104 to which the collar 102 is rigidly fastened by rivets 105 or the like. The runners 103 and 104 are integrally attached to opposite walls of the compartment 14 for movement realtive thereto, and consequently the collar 102 can be extended out in front of the compartment sidewalls but is not removable therefrom. The whole inner part 101 is able to undergo reciprocating movement through the compartment opening between an initial or retracted position within the compartment (see compartment 14 in FIGS. 1 and 7) and a final or extended position partially without the compartment (see compartment 12 in FIGS. 1 and 5).

The inner part 101 of each compartment, as it moves in between the above-mentioned retracted and extended positions (which are at opposite ends of its course of reciprocating movement), traverses a predetermined intermediate position (see compartment 13 in FIG. 1). The significance of this intermediate position will be explained hereinafter. For the purpose of visually indicating when the inner part is in its extended position and when it is in the predetermined intermediate position, a pair of parallel lines D and T of different lengths are located on the left side panel 102a of the extensible collar 102, as is shown in FIG. 1. Both of the lines D and T, which may be appropriately labeled, are hidden by the side sheet 15 and therefore are entirely out of sight when the collar is retracted. As the collar emerges from the compartment while being moved toward its extended position, the indicating lines become progressively exposed for viewing from outside the compartment, and the full length of the shorter line T is first visible when the collar reaches the intermediate position (see compartment 13 in FIG. 1). Only when the collar 102 attains its extended position is the full length of the longer line D exposed (see compartment 12 in FIG. 1).

Each of the inner parts 101 of the enclosure 11 supports an openable cover 106 which provides access to the associated compartment. Preferably the access cover is a metal door hinged at 107 to the front edge of the right side panel 102b of collar 102, as is shown in FIG. 3. The door 106 carries a latchbar 108 from which a pair of pins 109 laterally extnd (FIG. 4) for entering, respectively, two notches 110 formed at different elevations in the front ege of the left side panel 102a of collar 102. The latchbar 108 is connected by means of an angle iron 111 or the like to an appropriate door handle 112 which is located on the front side of the door 106 (see FIGS. 1, 2 and 6); the door is unlatched and swung open by manually raising and then pulling on handle 112. From FIG. 3 is is apparent that the collar 102 in effect comprises a door frame for the compartment door 106.

Whenever the compartment door is shut it completely closes the collar 102 and hence covers the front opening of the associated compartment, whereby the contents of the compartment are safely confined behind the metal shield which the door provides. The door 106, being attached to the collar 102, travels with the inner part 101 of the compartment as it is moved to its extended position. Although the collar and door then protrude in front of the compartment, the enclosed apparatus is not exposed but remains substantially wholly enclosed because the top and bottom panels and the side panels 102a and 102b forming the collar 102 will bridge the gap left between the door 106 and the front edges of the stationary walls 15, 16, 20 and 22 of the compartment. Consequently the apparatus which the compartment houses can be safely stored in an isolated state with the inner part 101 extended, collar 102 in conjunction with the door 106 serving to protect operating personnel as well as to prevent contamination of the apparatus by dust and the like.

In the illustrated embodiment of my invention, the apparatus which each compartment 12–14 is designed to enclose comprises an electric circuit breaker or interrupter identified generally by the reference numeral 201. The circuit breaker 201, which may be of any standard construction, has an operating handle 202 protruding from its front escutcheon for manual actuation thereof. As indicated most clearly in FIGS. 1 and 2, the handle 202 projects through an appropriate aperture in the compartment door 106 for convenient operation from in front of the housing.

Preferably the circuit breaker 201 is supported by the retractable inner part 101 of the breaker compartment, whereby the breaker is moved in concert with the inner part throughout the limited course of reciprocating movement thereof. In order to support the breakers, the inner part 101 is equipped with two sets of rollers 113 and 114 carried by the runners 103 and 104, respectively, for receiving a pair of rails 203 and 204 on which the circuit breaker 201 is removably disposed. See FIGS. 3, 5–7 and 11. There are two pairs of spaced apart lugs or pins 205 and 206 protruding laterally on opposite sides of the circuit breaker, and these pins are received, respectively, in appropriate recesses 207 and 208 provided in the top edges of the rails 203 and 204, as shown.

The circuit breaker 201 and the rails 203 and 204 on which it is mounted, all moving as a unit, can be slidably inserted and withdrawn with respect to the runners 103 and 104 of the compartment's inner part 101. The circuit breaker unit, once placed between the respective rollers of the companion roller sets 113 and 114 which the runners carry, is firmly yet removably supported by the runners for joint movement therewith. For this purpose each of the runners 103 and 104 is preferably provided with a locking lever 115 which is pivotally attached at 116 to the runner near the forward end thereof. As is clearly shown in FIGS. 5–7, the locking lever has a generally L-shaped configuration, and a camming surface of its lower arm is disposed to bear against the foremost pin 205, 205 protruding from the circuit breaker 201 in a manner securely to wedge the removable unit between the lever 115 and an abutting block 117 which is affixed to the rear end of each of the runners 103 and 104. In this disposition the lever 115 also locks the circuit breaker 201 to its rails 203 and 204.

By opening the compartment door 106 and then pulling forward manually on the upper arms 115a of both of the pivotally mounted locking levers 115, the lower arms of these levers will be raised from engagement with pins 205 and 206, thereby releasing the circuit breaker unit for withdrawal from the enclosing compartment to a position in which it is shown in FIG. 4. From this withdrawn position it is a simple matter to lift the circuit breaker 201 from the rails 203 and 204 and remove it from the enclosure 11 for maintenance, repair or replacement purposes.

For reasons which will become apparent soon hereinafter, I provide special interlock means to prevent the installation of the removable circuit breaker unit in a compartment of the enclosure except when the retractable inner part 101 of that compartment is in its fully extended position. The interlock means referred to, as can be seen in FIGS. 5–7, preferably comprises a pair of generally L-shaped interference levers 23 pivotally attached at 24 to left and right-hand sidewall brackets 25 and 26, respectively, of the stationary breaker compartment, in cooperation with a pair of pins 118 projecting inwardly from the extensible runners 103 and 104 and another pair of inwardly projecting pins 209 which are affixed to the breaker rails 203 and 204, respectively. The pins 209 are at a higher elevation than the pins 118 which in turn are higher than the points 24 of pivotal attachment of the interference levers 23.

Each interference lever 23 is biased by gravity to a normal disposition (shown in FIG. 7) in which the upper arm 23a thereof rises vertically from its pivot 24 and extends across the path of movement of both of the associated pins 118 and 209. The arm 23a cannot be moved rearwardly from this upright position because the lower arm of the lever 23 has been provided with a laterally projecting tab or pin 23b which overlays a stationary flange 25a, 26a of the adjacent sidewall bracket 25, 26 thereby blocking such movement. Consequently, assuming that the breaker unit were removed from the compartment, so long as the interference levers 23 are in their normal dispositions the return of the removable unit is blocked by the upright arms 23a whose forward edges will be engaged by the pins 209, respectively, to prevent full insertion of the rails 203 and 204 into the runners 103 and 104, respectively.

The interference levers 23 quit their normal dispositions and will not impede the return of the breaker unit to its supported position on runners 103 and 104 whenever the inner part 101 of the compartment is in its extended position (shown in FIG. 5). This disabling of the interlock means is accomplished by the action of the pins 118 which travel forward with the runners from which they project and, just as the retractable inner part 101 of the compartment closely approaches its extended position, move into engagement with the rear edges of the upper arms 23a of the levers 23, whereby both arms 23a are tilted frontwardly and held by the pins 118 in a position which is below the path of movement of the breaker rail pins 209. It is apparent that so long as the inner part 101 remains in its extended position, the levers 23 will not interfere with the ingress of a removable breaker unit.

If desired, the above-described locking levers 115 and interference levers 23 could alternatively be replaced by a combined interlock device capable of performing both of their functions. In other words, equivalent means might be provided to bar installation of a removed breaker unit except when the retractable inner part 101 of the breaker compartment is in an extended position, with the same means being arranged firmly to capture the removable unit, when properly installed, for joint travel with the inner part upon movement thereof from its extended position.

Turning again to FIG. 1, the breaker units housed in the enclosure 11 are seen to include spring-loaded "primary" disconnect members 210 which are aligned respectively, with stationary "primary" disconnect members 27 mounted on insulating bases 28 suspended from the rear walls 17 of the breaker compartments. In each compartment the disconnect members 210 and 27 are interengaged whenever the inner part 101 which supports the circuit breaker 201 is retracted (see compartment 14 in FIG. 1), while they are separated and hence disconnected whenever the inner part has been extended as far as its intermediate position (see compartment 13 in FIG. 1). These cooperating primary disconnect members enable the circuit interrupting contacts (not shown) of each circuit breaker 201 to be electrically connected to supply and load circuits 29 and 30 respectively, whereby the flow of electric power to the load circuit is controlled by operation of the circuit breaker contacts. The equipment illustrated is used most commonly for controlling and protecting 3-phase power circuits; hence 3-pole breakers are used, and each compartment has three pairs of disconnect members 27, as is shown in compartment 12 in FIG. 2.

Circuit breakers of the kind illustrated are often equipped with suitable mechanisms for "electrical" operation thereof. That is, the breakers include devices such as motors, solenoids and the like for the purpose of opening and closing their circuit interrupting contacts in response to operation of suitable control switches (not shown) located locally or remotely therefrom. Such devices must be connected to appropriate control wiring and circuits in the stationary enclosure 11, and for this purpose separable "secondary" disconnect members are provided, as shown, by way of example, in FIG. 1 at 211 and 31. A secondary disconnect member 211 comprising a plurality of upstanding, yieldable conductive fingers is carried by each removable circuit breaker unit on top thereof, and a secondary disconnect member 31 having a plurality of spaced-apart conductive bars depends from each horizontal barrier 19–21 of the stationary enclosure. In each of the compartments the respective conductive elements of these cooperating members are slidably interengaged so long as the inner part 101 of the compartment is in either its retracted or its intermediate positions (see compartments 14 and 13 in FIG. 1), but they become disconnected upon movement of the inner part to its extended or final position (see compartment 12 in FIG. 1).

It is apparent now that the three different positions of the retractable inner part 101 of each breaker compartment—namely the retracted and extended positions at opposite ends of its limited course of reciprocating movement and the intermediate position traversed therebetween—correspond to (1) the fully inserted or operating position of the removable breaker unit in which both the primary and the secondary sets of disconnect members are respectively interconnected and the circuit breaker 201 is energized, (2) an intermediate or "test" position of the breaker unit in which only the secondary disconnect members are interconnected, and (3) a disconnect or storage position in which all of the cooperating disconnect members are separated and the breaker 201 is entirely deenergized. The purpose of the above-mentioned intermediate or test position (which is positively defined by position stop means to be described hereinafter) is to allow testing of the breaker's electrical operation without energizing the load circuit 30 each time the interrupting contacts of the circuit breaker being tested are closed. The interlock means comprising the interference levers 23 and the pins 118 and 209, as previously described, serves to prevent the removable unit from being pushed back to its fully inserted or operating position except in conjunction with a retraction of the inner part 101 of the breaker compartment.

It has been noted hereinbefore that the retractable inner part 101, which supports the breaker unit and carries it between the preselected positions reviewed above, is telescopically attached to the walls of the breaker compartment. Toward this end, two sets of rollers 33 and 34 are mounted on the stationary sidewall brackets 25 and 26, respectively, for receiving the two runners 103 and 104 on which the collar 102 of the inner part 101 is mounted. See FIGS. 3, 5-7 and 11. As is best seen in FIGS. 1-3 and 6, the top and bottom panels of the collar 102 are both slotted to accommodate a pair of stationary guide pins 35 and 36 which have enlarged heads and project vertically a short distance from the top and bottom closures, respectively, of the associated compartment. In order to drive the collar 102 and its supporting runners 103 and 104 through the limited course of reciprocating movement thereof, and thereby move the circuit breaker unit between its operating and storage positions, a suitable racking mechanism is provided.

The racking mechanism referred to comprises a pair of orbital camming members or cranks 37 and 38 which, in the illustrated embodiment of my invention, are anchored to stationary walls of the breaker compartment in motion transmitting relationship with the breaker supporting runners 103 and 104, respectively. The members 37 and 38 comprise ratchet wheels or disks respectively keyed to opposite ends of a common shaft 39. As is shown in FIGS. 1 and 2, the rotatable shaft 39 horizontally spans the rear of the associated breaker compartment, and it is journaled near both ends in stationary plates 40 (FIG. 8) which are appropriately affixed to the compartment walls in spaced relation to the sidewall brackets 25 and 26, respectively.

The ratchet wheel 37 is affixed to the left end of the shaft 39 between bracket 25 and plate 40, and it is located immediately adjacent to the block 117 which is fastened to the rear end of runner 103. This wheel carries an eccentric cam roller 41 which projects laterally therefrom into a generally vertical camming slot 119 formed in the block 117, as can be seen in FIGS. 5, 6 and 8. At the right end of the common shaft 39 the ratchet wheel 38 is positioned immediately adjacent to the block 117 which is affixed to the rear end of the runner 104, and it has an eccentric cam roller 42 projecting laterally therefrom into a generally vertical camming slot 120, shown in FIG. 7. The height of each of the camming slots 119 and 120 is slightly greater than the diameter of the path circumscribed by a cam roller. As the camming members 37 and 38 rotate, their rollers 41 and 42 will orbit in unison about the fixed axis of the common shaft 39, riding up and down in the associated camming slots 119 and 120 of the respective blocks 117 which the rollers inseparably engage. The resulting coaction between these cooperating elements will translate the runners 103 and 104, and hence the whole inner part 101 is moved or racked from its retracted position in the breaker compartment to its extended or protruding position and back.

In order to rotate the camming members 37 and 38, the racking mechanism includes operating means having sufficient mechanical advantage to enable a person of ordinary strength to carry out the racking operation manually with the exercise of only a reasonable amount of physical effort. Preferably the operating means comprises a T-handle 301 which is operatively coupled to the rotatable ratchet wheel 37 by means of a flexible cable 43, a system of pulleys 44, a pivotally mounted lever 45, and a pawl 46.

As can be seen in FIGS. 5 and 6, the pawl 46 is a long curved arm pivotally mounted between its ends on a pin 47 which is carried by one end of the lever 45. The head of the pawl is provided with a hook 46a for driving the peripheral teeth 37a of the ratchet wheel 37. A torsion spring 48 is disposed on pin 47, as is best seen in FIG. 8, to bias the pawl 46 counterclockwise with respect to the lever 45, whereby the hook 46a will yieldably engage the ratchet teeth 37a as shown in FIG. 6. However, this operative interengagement between hook 46a and teeth 37a can be prevented, and hence the racking mechanism will be disabled, by an interlock member 49 which moves, under circumstances that will later be explained, to a position where it engages the tail 46b of pawl 46 and tilts the pawl clockwise against its bias, whereby the hook 46a is held off the teeth 37a, as shown in FIG. 5. The construction, operation and purpose of this disabling means will be fully explained following a description of the rest of the racking mechanism.

The lever 45 which carries pawl 46 is pivotally mounted on the shaft 39 adjacent to the ratchet wheel 37 for oscillatory movement with respect thereto. The lever is actuated in a clockwise direction, as viewed in FIGS. 5 and 6, by a cable 50 which runs over a pulley 51 rotatably mounted on a pin 52 projecting from lever 45 in quadrature with the pin 47. The pin 52 is located closer to the axis of shaft 39 than pin 47. It is apparent that the lever 45 in essence is a bell crank which, when pivoted clockwise, so moves the pawl 46 as to advance the ratchet wheel 37 in a clockwise direction. The lever is biased in a counterclockwise direction by a tension spring 53 connected between it and the stationary mounting plate 40.

The cable 50 and pulley 51 are part of the pulley system 44. Opposite ends of cable 50 are respectively attached to two different rims of a double pulley 54. The double pulley 54 is rotatably disposed on a shaft 55 located directly under the pulley 51, and as is best seen in FIG. 8, the ends of shaft 55 are anchored to the stationary bracket 25 and plate 40, respectively. A stop pin 56 protrudes from the stationary plate 40 a short way from the shaft 55 and is disposed in a 330-degree concentric groove 57 formed in the side of the double pulley; consequently the rotation of this pulley is limited to 330 angular degrees.

In FIGS. 5 and 8 it is apparent that the double pulley 54 has one rim 54a of greater diameter than the adjoining rim 54b. One end of the cable 50 is affixed to the greater rim 54a. The cable then loops over the companion pulley 51 and is wrapped in a counterclockwise sense once around the lesser rim 54b of the double pulley 54, with the end 50b of the cable being affixed to the lesser rim at a point which is almost diametrically opposite the cable end 50a. Upon rotating the double pulley through 330 degrees in a clockwise direction from the starting position in which it is shown in FIG. 5 to an angular position shown in FIG. 6, the cable 50 is played out of the lesser rim 54b and is wrapped onto the greater rim 54a. Because of their different diameters, more cable is wrapped onto the greater rim 54a than leaves the lesser rim 54b, and the cable loop extending over the pulley 51 is therefore constricted. As a result of this differential pulley arrangement, the driven pulley 51 is pulled downwardly by the cable 50 (with a large mechanical advantage being realized), and the lever 45 to which it is attached is tilted clockwise on shaft 39 through an angle of about 36 degrees, whereby the pawl 46 is actuated to advance the rotatable ratchet wheel 37 by a predetermined number of degrees.

Since the ratchet wheel 37 is keyed to the shaft 39, the shaft also rotates to advance the companion ratchet wheel 38 through the same angular increment. As is shown in FIG. 7, the peripheral teeth 38a of the latter wheel are yieldably engaged by a holding pawl 58. This pawl is pivotally supported by means of a pin 59 mounted on stationary plate 40, and a hooked end 58a thereof is biased into engagement with the ratchet teeth 38a of the wheel 38 by an appropirate tension spring 60. The holding pawl 58 in cooperation with the ratchet teeth 38a serves positively to prevent appreciable back-tracking (reverse rotation) of the cam members 37 and 38 while the ratchet operating pawl 46 returns from its FIG. 6 disposition to its starting position shown in FIG. 5.

In order to rotate the double pulley 54 in a clockwise direction, thereby advancing the camming members as explained above, a driving pulley 61 is mounted adjacent thereto on the shaft 55. The driving pulley 61, which can be seen in FIGS. 6 and 8, is connected to the T-handle 301 by means of the flexible cable 43 which is wrapped more than one full turn around its rim. By grasping the handle 301 and pulling on the cable 43, the driving pulley 61 is rotated about its axis in a clockwise direction.

The diameter of the driving pulley rim is the same as that of the greater rim 54a of the double pulley 54. These two pulleys are operatively interconnected by lost-motion means comprising a pin 62 in an arcuate slot 63. The pin 62 is affixed to the double pulley 54 from which it laterally protrudes, as is shown in FIG. 8. The arcuate slot 63 through which the pin 62 extends is located concentrically in the web of the adjacent pulley 61 as is shown in FIG. 6. The purpose of the lost motion coupling will be explained below. For now it is sufficient to understand that, as the driving pulley 61 is rotated in a clockwise direction (as viewed in FIGS. 5 and 6), the trailing end of the slot 63 engages the pin 62 of the double pulley 54 thereby operating the double pulley in the same direction through its limited 330-degree rotation.

The actuating handle 301 for the racking mechanism is seatable in a special insert or bushing 121 of a mounting bracket 122 which preferably is affixed to the left side panel 102a of the extensible collar 102. An appropriate opening 123 in the front cover 106 makes the handle 301 conveniently accessible from outside the breaker compartment with the cover closed, as is indicated in FIGS. 1–3.

In order to carry out a racking operation, the handle 301 must successively be pulled as far away from the compartment cover as the attached cable 43 permits. After each stroke of the handle it returns automatically to its seated position or terminus in the bushing 121. This return is caused by the reaction of two coil springs 64 and 65, best seen in FIG. 8, which are disposed to bias the driving pulley 61 in a direction recalling the cable 43.

The coil spring 64, which is also partially visible in FIG. 6, is relatively strong. Its inner end is anchored to the pulley mounting shaft 55 between the pulleys 54 and 61, and its outer end is fastened to the pin 62 which protrudes from the double pulley 54. This spring is disposed to urge the pin 62 in a counterclockwise direction, as viewed in FIGS. 5 and 6, whereby the double pulley is biased in a counterclockwise direction to its starting position shown in FIG. 5. The pin 62 acting in the lost-motion slot 63 of the driving pulley 61 tends to turn the driving pulley in the same direction. The other coil spring 65 is fastened at its outer end to the distal end of pin 62, while its inner end is anchored to the hub of the driving pulley 61. This relatively weak spring is stressed upon angular movement of the driving pulley, relative to the pin 62, in a clockwise direction, and hence the pulley 61 is additionally biased in a counterclockwise direction toward an initial position in which the leading end of its slot 63 would engage the pin 62.

The purpose of a lost-motion coupling (comprising the pin 62 and a slot 63) between the driving pulley 61 and the double pulley 54 will now be apparent. As is illustrated in the drawings, the terminus of the operating handle 301 travels with the relatively movable inner part 101 of the breaker housing, while the axis of the pulley mounting shaft 55 is fixed. Consequently, the free length of cable 43 extending between the handle terminus and the driving pulley varies in dependence upon the position of the inner part 101 along its course of reciprocating movement. This length is shorter when the inner part is retracted than when extended. To compensate for such variance, the lost-motion slot 63 is provided, and its length is made approximately equal to the overall distance which the inner part 101 travels between opposite limits of its reciprocating movement. As a result, all variations in the free length of the cable 43 are accommodated by the driving pulley 61, and the double pulley 54 can be rotated from the same starting position through its full 330 degrees by every stroke of the handle 301.

In order more clearly to understand the manner in which the above-described racking mechanism drives the retractable inner part 101 through its limited course of reciprocating movement, a rack-in operation of the mechanism will now be briefly described. For this particular purpose, no consideration is given to the automatically operative position stop means and the accompanying reset means for manually releasing the same. Their structure and operation, to be fully described soon hereinafter, can be disregarded here. In this connection, it should be assumed that the interlock member 49 is out of engagement with the tail of pawl 46 and that nothing interferes with the rack-in operation being described.

Before beginning the rack-in operation, the inner part 101 of the breaker compartment is in its extended position, and the removable breaker unit is in its corresponding "disconnect" or storage position. This is shown in FIG. 5, where the cam roller 41 of the racking mechanism, riding in the camming slot 119 of the supporting runner 103 of the retractable inner part 101, is seen to be located at the most frontwardly disposed point of its orbit. The double pulley 54 and hence the oscillatory lever 45 of the racking mechanism are both shown in their starting positions in FIG. 5, and the racking handle 301 is at rest at its terminus in the bushing 121.

The first step of the rack-in operation is begun by pulling the handle 301 from in front of the compartment so as to extend the cable 43 thereby rotating the driving pulley 61, and conjunctively the double pulley 54 which is coupled thereto, in a clockwise direction through 330 degrees. This constricts the cable loop 50, tilts the lever 45 clockwise, and so moves pawl 46 that the pawl drivingly engages one of the peripheral teeth 37a of the ratchet wheel 37 and advances this member through about 30 degrees. As a result the roller 41 is moved clockwise along its orbital path, thereby rising in the camming slot 119 and camming the runner 103 rearwardly. The same camming action takes place between the other runner 104 and the companion camming member 38 which is keyed with member 37 to the common shaft 39. The disposition of the various parts of the racking mechanism at this point is illustrated in FIG. 6. It will be observed that the amount by which the inner part 101 of the compartment is retracted during the first step of the rack-in operation (and during each of the successive steps which follow) depends upon the radius of the orbital path, and particular angle of advancement of the cam roller, and the contour or profile of that portion of the camming slot which the roller traverses.

Upon completing the first stroke of the racking handle 301 (and each of the successive strokes which follow), the handle is allowed to return to its terminus. During this return the coil spring 64 effects counterclockwise rotation of the double pulley 54 toward its starting position, and the driving pulley 61 is correspondingly turned, thereby recalling the extended cable 43. Due to the differential rims on the double pulley, the loop of cable 50 is distended. Consequently the bias spring 53 now tilts the oscillatory lever 45 counterclockwise, and the ratchet operating pawl 46 returns to its starting position. Here it is again positioned for drivingly engaging another one of the peripheral teeth 37a which succeeds by about 30 angular degrees the one tooth previously engaged. The starting position of the double pulley 54, and hence the starting position of the lever 45, is determined by stop pin 56 which is located in the pulley groove 57. The lost-motion coupling comprising the pin 62 in slot 63 enables the driving pulley 61 to continue turning in the counterclockwise direction, under the influence of bias spring 65, until the racking handle 301 has attained its terminus.

Having now concluded the first step of the rack-in operation, the T-handle 301 is again pulled in order to continue the angular advancement of the camming members 37 and 38, whereby the inner part 101 is further retracted in a manner precisely the same as that described above. The ratchet teeth 37a have been so arranged that the inner part 101 will just reach its predetermined intermediate position, corresponding to the "test" position of the removable breaker unit, at the end of the second stroke of the handle.

Four more successive strokes of the racking handle 301 are required in order to drive the inner part 101 from its intermediate position to its retracted position shown in FIG. 7, wherein the removable circuit breaker unit resides in its "connected" or operating position. The cam rollers 41 and 42 of the racking mechanism have now been incrementally advanced to the most rearwardly disposed points of their respective orbits. During this final phase of the rack-in operation, the spring-loaded primary disconnect members 210 will engage the cooperating disconnect members 27, and consequently the frictional forces which resist and oppose movement of the inner part are significantly increased. For the purpose of overcoming this increased "back pressure" without objectionably increasing the input energy required of the operator, the profile of the camming slots 119 and 120 has been designed to provide, in cooperation with the rotatable camming members 37 and 38, respectively, appropriately increased mechanical advantage at those stages of travel of the inner part 101 where the back pressure is greatest.

As can be seen in FIG. 7, the holding pawl 58, which engages the peripheral teeth 38a of the camming member 38 to prevent back-tracking of the rotatable camming members during the rack-in operation, also helps hold the inner part 101 in its retracted position against mechanical and magnetic forces which tend to move the circuit breaker unit out of its operating position. Toward this end the rear edge of each of the camming slots 119 and 120, substantially midway between the ends thereof, has been so inclined from vertical as to establish in conjunction with the cooperating rollers 41 and 42 a reverse moment in the camming members 37 and 38. Because of this "negative" slope of the camming slot, any spurious attempt on the part of the inner part 101 to move from its retracted position tends to cause reverse or backward rotation of the camming member 38, but such rotation will be positively blocked by the holding pawl 58. Of course the retracted inner part may intentionally be extended by carrying out a rack-out operation of the racking mechanism which, like the rack-in operation described above, requires six repeated strokes of the operating handle 301 to incrementally advance the rotatable camming members through another 180 degrees thereby driving the inner part 101 to its extended position shown in FIG. 5.

The ratchet wheel and pawl type racking mechanism that has been shown in the drawings and described hereinbefore is the claimed subject matter of my copending patent application S.N. 154,942 on November 27, 1961, and assigned to the assignee of the present application. As will be apparent to those skilled in the art, this preferred mechanism is but one illustrative example of various means available for driving the relatively movable inner part 101 of my present invention from its retracted position within the stationary breaker housing to its extended position partially without the housing and back. For instance, the present invention could alternatively be adapted to utilize a racking mechanism of the kind shown in U.S. Patent No. 3,005,064, Baird et al., granted on October 17, 1961, or the movable inner part 101 could be impelled by hand through a portion of its total travel without the aid of any force-amplifying-means. While the illustrated ratchet wheel and pawl arrangement is especially well suited to the functional needs of the present disclosure, its particulars are not intended to be part of the invention being claimed herein.

The operating (connected), test and storage (disconnect) positions of the circuit breaker unit, to which it is moved by operating the above-described racking mechanism, are distinctly and positively defined by position stop means which will now be described. In the illustrated embodiment of my invention the position stop means comprises a stop member 124—which is mounted on a pin 125 affixed to the left-hand extensible runner 103 of the breaker supporting means for pivotal movement with respect thereto—in cooperation with a notched slot 66 which is disposed in the stationary sidewall bracket 25 of the breaker housing. These parts are shown in FIGS. 8–10 of the drawings.

As can be seen in FIGS. 9 and 10, the slot 66 in bracket 25 has a horizontally elongated open portion, with three spaced-apart stops or notches 66c, 66t and 66d being formed in the bottom edge thereof. The stop member 124, which as shown in FIG. 8 is located on the opposite side of the bracket 25 from the runner 103, has a pin 126 which protrudes laterally therefrom into the slot 66 for releasably entering the notches 66c, 66t and 66d as the pin moves into proximity respectively therewith during reciprocating movement of the runner 103. The pin 126, when approaching each notch in the slot 66, is biased downwardly therein by the action of a compression spring 127. As best seen in FIGS. 8 and 9, this spring is located on a spring guide rod or link 128 so as yieldably to urge a pin 129, which is affixed to the stop member 124, away from a lug 130 affixed to the runner 103, thereby biasing the whole stop member in a clockwise direction (FIG. 9) about the axis of pin 125. To permit pin 125 and the lug 130 which are carried by the runner 103 to pass through the stationary bracket 25 and move rectilinearly in unison with the runner, the pin 125 has been disposed at an appropriate elevation to travel freely in the open portion of the slot 66, and an additional slot 67 has been provided in bracket 25 to accommodate the lug 130, as is shown most clearly in FIG. 9.

The notches 66c, 66t and 66d of the position stop arrangement described above are discretely located so that the pin 126 of the stop member 124 automatically enters a notch, thereby physically blocking movement of the runner 103 and hence preventing further movement of the circuit breaker supporting means, when the retractable inner part 101 of the breaker compartment reaches each of its three predetermined positions (retracted, intermediate and extended, respectively) corresponding to the connected, test and disconnect positions of the circuit breaker unit. So long as the stop means is thus disposed, the inner part 101 and the circuit breaker 201 supported thereby are held in their obtained positions. They cannot be moved from such position until the stop means has been released.

In order to release the stop means and thereby enable the inner part 101 to be racked to its next succeeding position, a manually operative reset mechanism is provided. This mechanism is mounted on the extensible collar 102 and is so coupled to the stop member 124 as to tilt this member against its bias, thereby releasably moving the pin 126 out of the notch 66c, 66t or 66d in which it was disposed, when desired. The particular reset mechanism that has been shown in the preferred embodiment of my invention, and that will now be described, is the claimed subject matter of a copending patent application S.N. 194,360; Boyden, filed on May 14, 1962, and assigned to the assignee of the present application.

The illustrated reset mechanism, as best seen in FIGS. 5 and 6, comprises an elongated push rod or bar 131 slidably mounted on the breaker supporting means above the runner 103 for lengthwise movement relative thereto. The rear end of the push rod 131 is connected to the stop member 124 by means of a pin 132 which projects laterally from the rod through a narrow horizontal slot 68 in the stationary sidewall bracket 25 and into a short vertically disposed slot 133 located in the member 124. (See FIGS. 8 and 9.) The rod 131 includes a guide slot 134 which slidably embraces a supporting pin 135 affixed to the left-side panel 102a of the collar 102, and the forward end 136 of the rod is pinned to the upper end of a direction changing lever 137 which is pivotally mounted at 138 on the runner 103. The lower end of lever 137 is linked at 139 to a rod-like member 140 which is slidably disposed in a bushing 141 carried by the mounting bracket 122. The member 140 extends through the opening 123 in the front cover 106 of the breaker compartment, and it is terminated outside the housing by a conveniently accessible reset knob 142.

The push rod 131 is impelled frontwardly by the stop member 124, as its pin 126 enters a position-stop notch in slot 66, to the foremost position of the rod which is shown in FIG. 5. Consequently the reset knob 142 is "in" whenever the position stop means is in a movement-blocking disposition (FIGS. 8 and 9). By manually pulling the knob 142 to an "out" or reset position (142a in FIG. 6), the lever 137 is pivoted in a clockwise direction thereby shifting the push rod 131 rearwardly with respect to the runner 103. The pin 132 projecting from the push rod moves the stop member 124 against the force of the bias spring 127, and pin 126 of the stop member will be lifted from the bottom of the cooperating position-stop notch. In this manner the stop means is released or unblocked to permit continued movement of the retractable inner part 101 and the circuit breaker 201 carried thereby to their next position.

As is taught in the aforesaid Boyden application, the illustrated position stop and reset means are so constructed and arranged that the reset knob 142, upon manual operation thereof, is releasably latched in its reset position where it so remains even when released by the operator. The result has been accomplished by disposing the stop member 124 and its bias spring 127 so that the stop member is bidirectionally biased.

Referring to FIGS. 9 and 10, the stop member 124 and spring guide link 128 are seen in essence to be an overcenter toggle combination, with pin 129 comprising the knee of the toggle. The resetting operation referred to above not only causes the stop member to move (counterclockwise from its FIG. 9 disposition) until pin 126 is released from a position-stop notch in slot 66, but it further tilts the stop member (to its FIG. 10 disposition) and thereby causes the toggle knee 129 to move past dead center with respect to a straight line connecting the axes of pin 125 and lug 130. As a result of this overcenter movement by the toggle, the direction of the bias provided by the compression spring 127 is now reversed, and the pin 126 is yieldably urged upwardly against the top edge of slot 66 which has been notched at 69c, 69t and 69d for this purpose. Consequently the push rod 131 will be retained or latched in its rearwardly shifted position, and the reset knob 142 is releasably held in its reset position.

In order to change the direction of the bias torque in stop member 124 after the resetting thereof, so that the pin 126 will be predisposed automatically to enter the next succeeding position-stop notch in the bottom edge of slot 66 of the stationary sidewall bracket 25 (for movement-blocking purposes), the upper surface of this slot depends between the notches 69c, 69t and 69d and the notch sides 70 are declined as is shown in FIGS. 9 and 10. A declined side 70 serves to cam the pin 126 downwardly, and hence tilt the cam member 124, as the inner part 101 of the breaker compartment moves from any one of its three predetermined positions, whereby the toggle knee 129 is returned through dead center and the compression spring 127 again urges the pin 126 downwardly against the bottom edge of the slot 66. After this overcenter movement by the toggle, and while the pin 126 is approaching the next position-stop notch 66c, 66t or 66d, the stop member 124 will travel in an angular disposition approximately half way between those in which it is shown in FIGS. 10 and 9, respectively, and consequently the push rod 131 and its reset knob 142 will be moved, relative to their supporting runner 103 and collar 102, to intermediate positions which are substantially midway between reset and those shown in FIG. 5. These parts are seen in their intermediate positions in FIG. 6.

Upon reaching the next position-stop notch, the pin 126 of the stop member 124 necessarily falls into movement-blocking engagement therewith, and simultaneously the push rod 131 is impelled frontwardly to its foremost position. This retracts the reset knob 142 which then assumes its "in" position, indicating visually that one of the three predetermined positions of the breaker supporting means has just been reached. Manual operation of the reset mechanism is again required in order to release the stop means and unblock the retractable inner part 101.

In accordance with my invention, the releasable stop means described hereinbefore is also disposed temporarily to disable the racking mechanism each time it operates. This "belt and suspender" arrangement offers the advantage of insuring against undesirable loading of not only the stop means 66, 124–26 but also the operating means 43–46 which drives the camming member 37 of the racking mechanism. In other words, should an operator in carrying out a rack-in or rack-out operation of the circuit breaker unit thoughtlessly attempt to continue such operation, after the unit reaches its test position, without first manipulating the reset knob 142 to release the position stop means, no damage will be done to any of the pins, levers, pulleys and other parts of the illustrate dstop means and racking mechanism. On the other hand, without the disabling provision referred to there would be a real possibility that a forceful misoperation of this kind might bend or otherwise damage some of these parts.

The racking mechanism is disabled, and operation of the camming member 37 by the T-shaped actuating handle 301 is consequently prevented, in response to movement of the position stop member 124 to its blocking disposition (FIGS. 5, 8 and 9) when the inner part 101 arrives at each of its three predetermined positions. Although a more direct coupling between member 124 and the racking mechanism would be suitable for this purpose, an interlock linkage utilizing the push rod 131 and the interlock member 49 has been found particularly advantageous for the embodiment of my invention illustrated herein.

The interlock member 49 of this preferred linkage is pivotally mounted on a pin 71 which is affixed to the stationary sidewall bracket 25 of the breaker compartment, and the push rod 131 is provided with a horizontally elongated slot 143 through which the pin 71 extends. Three spaced-apart notches 143c, 143t and 143b are formed in the bottom edge of the slot 143. The interlock member 49 includes a pin 72 which protrudes laterally therefrom into the slot 143 where it will enter an appropriate one of the notches 143c, 143t and 143d under the influence of a biasing spring 73, whenever the inner part of the breaker compartment is in one of its three predetermined positions and the push rod 131 has been impelled to its foremost position (indicating that the position stop member 124 is in a movement-blocking disposition). With the pin 72 disposed in any one of the notches of slot 143, the interlock member 49 is tilted, as shown in FIG. 5, to an angular position wherein it engages the tail 46b of the pawl 46 and so tilts the pawl as to prevent its hooked end 46a from engaging the ratchet teeth 37a of the camming member 37. Consequently, the cam roller 41 of member 37 is rendered incapable of coacting with the slotted block 117 of runner 103 for the purpose of driving the inner part 101 from its obtained position.

In order to return the interlock member 49 to a non-disabled position (in which it is shown in FIG. 6), the forward side 144 of each notch 143c, 143t, 143d in the push rod 131 is inclined as shown. An inclined side 144 will cam the pin 72 upwardly out of the notch in which it was residing, thereby tilting the member 49 clockwise in opposition to the bias provided by spring 73, as the push rod is shifted rearwardly during a position-stop-means releasing operation. It is therefore apparent that, by manually pulling the reset knob 142 to its reset position, the interlock member 49 is reset and the pawl 46 is again enabled to operate the camming member 37.

In order to prevent the pin 72 from prematurely falling into a notch in slot 143 while the inner part 101 is moving between its predetermined positions, the extensible runner 103 is equipped with a raised shoulder 145 having spaced-apart indentations 145c, 145t and 145d along its upper edge. The pin 72 moves to a position directly over these respective indentations only when the circuit breaker unit attains its connected, test and disconnect positions, respectively, and consequently the raised shoulder 145 does not interfere with the above-described disabling action which will take place each time the push rod 131 is impelled frontwardly by operation of the position stop means. But the raised portions of the shoulder 145 between indentations therein, being slidably engaged by the pin 72, will keep the interlock member 49 in its reset position while the breaker unit is moving in between the aforesaid positions, even though pin 72 rides over one of the notches in slot 143 of the push rod 131 which is then in its intermediate disposition, as shown in FIG. 6, for example.

As taught in the aforesaid copending Boyden application S. N. 194,360, the push rod 131 has other means associated therewith to effect conventional breaker interlock functions which may be summarized as follows: (1) to prevent the undertaking of a racking operation if the circuit-interrupting contacts of the circuit breaker 201 are closed, and (2) to prevent closing of the circuit breaker while the racking mechanism is being operated. Toward this end, the push rod 131, as is shown in FIGS. 5, 6 and 11, includes (1) a laterally projecting tab 146 located near the forward end of a rectangular opening 147 therethrough, and (2) a laterally offset cam element 148 of a trapezoidal shape, the front and rear sides (148a and 148b) of which provide inclined camming surfaces.

The circuit breaker 201 (see FIGS. 4, 5, 6 and 11) is equipped with cooperating interlock elements comprising: (1) a pivotally disposed upstanding link 212 actuated in response to circuit-closing movement of a switch member 213 of the breaker, and (2) a vertically movable tripping link 214 which is coupled to a trip latch shaft 215 for actuating the same when lifted. While the various circuit breaker parts which are connected to the switch member 213, being entirely conventional, have not been shown in the drawings, it will be understood by those skilled in the art that the switch member is moved from the broken-line position shown in FIG. 11 to the higher dot-dash-line position shown in the same figure during a closing operation of circuit-interrupting contacts of the breaker. It will further be understood that the trip latch shaft 215, upon being tilted from the angular position in which it is shown in FIG. 5 to its FIG. 6 disposition, is so interconnected with the contact mechanism of the circuit breaker 201 as to effect tripping of the breaker and also to prevent subsequent closure of the circuit-interrupting contacts in a conventional manner.

In order to accomplish the first breaker interlocking function referred to, the interlock link 212 is bent over at its upper end 212a so as to move behind the tab 146 of the push rod 131 whenever the circuit breaker 201 is closed. It is apparent in FIGS. 5 and 11 that this obstructs resetting movement of the push rod 131, whereby the position stop means will hold the retractable inner-part 101 in its obtained position and the racking mechanism remains disabled. On the other hand, the bent over end 212a of the interlock link 212 is tilted out of the way of the tab 146 whenever the circuit breaker 201 is open, thereby enabling the position stop means to be reset and a racking operation to be undertaken.

In order to accomplish the second breaker interlock function referred to, the interlock link 214, which is guided by means of pins 216 located on the circuit breaker 201, is provided at its upper end with a laterally protruding pin 217 which rides along the top edge of the cam element 148 of the push rod 131. With the push rod 131 in its foremost position, as is shown in FIG. 5, the pin 217 is disposed immediately behind side 148b of the cam element, and as a result the link 214 is in a lowered position which enables the trip latch shaft 215 to assume its non-tripping angular position. The circuit breaker 201 can now be closed at will. Upon manipulating the reset knob 142 to reset the position stop means and render the racking mechanism operable, however, the push rod 131 is shifted rearwardly thereby causing the rear camming surface 148b of the element 148 to elevate pin 217, whereby the link 214 is lifted to actuate the trip latch shaft 215 of the circuit breaker 201. So long as the push rod 131 is in either its reset position or its intermediate position (FIG. 6), as it will be while a racking operation is being carried out, the tripping interlock link 214 will hold the trip latch shaft in its FIG. 6 disposition, thereby preventing closure of the circuit-interrupting contacts of the breaker.

While a prefered form of the invention has been shown and described by way of illustration, many modifications will occur to those skilled in the art. I therefore contemplate by the claims which conclude this specification to cover all such modifications as fall within the true spirit and scope of my invention.

What I claim as new and desire to secure by Letters Patent of the United States is:

1. Means for enclosing electric apparatus comprising: a metal-walled housing having an opening therein, the housing including a retractable inner part inseparably attached to a wall of the housing for telescopic movement through said opening so as partially to protrude without the housing; a metal access cover for closing said opening; and means for supporting said cover on said inner part, whereby the cover travels with the inner part on movement thereof; said inner part including means for receiving electric apparatus and means for maintaining the apparatus substantially wholly enclosed when the inner part is in its protuberant disposition.

2. In an enclosure for an electric circuit interrupter: a relatively stationary compartment having an opening therein, the compartment including an extensible collar telescopically fitted into said opening for reciprocating movement between retracted and extended positions, said collar having means fastened thereto for removably supporting a circuit interrupter; an openable access door attached to said collar for closing the collar, thereby confining the contents of said compartment; and racking means mounted in said compartment for driving the extensible collar to and from its retracted position.

3. The enclosure of claim 2 in which the racking means includes actuating means operatable from outside the compartment with the access door closed.

4. In a housing for electric apparatus; a pair of spaced metal sidewalls; two parallel, elongated members having means for supporting electric apparatus, said members being attached slidably to the sidewalls, respectively, for limited lengthwise movement relative thereto between predetermined terminal positions, a relatively short metal collar fastened to said members and disposed to fit within the housing between said sidewalls, the collar being movable between a retracted position within the housing and an extended position without the housing, said retracted and extended positions corresponding, respectively, to said terminals positions of said members; and an openable access cover attached to said collar for enclosing electric apparatus supported by said supporting means, whereby the apparatus is maintained substantially wholly enclosed by said collar and said cover when the collar is in its extended position and the cover is closed.

5. The housing of claim 4 in which the supporting means enables the supported apparatus to be slidably withdrawn and removed from the housing when the members have been moved to the terminal position which corresponds to the extended position of the collar.

6. In an enclosure for an electric circuit interrupter: a relatively stationary compartment having an opening at the front thereof, the compartment including an extensible collar telescopically fitted into said opening and disposed for limited reciprocating movement between an initial position within the compartment and a final position in which the collar protrudes in front of the compartment, said collar having means fastened thereto for removably supporting a circuit interrupter; and an openable front cover for closing said opening, the cover being attached to said collar, whereby the circuit interrupted is maintained substantially wholly enclosed by said collar when in its final position, in conjunction with said cover when closed.

7. The enclosure of claim 6 in which means are provided for visually indicating when the extensible collar is in its final position and when it is in a predetermined intermediate position between its initial and final positions, said indicating means comprising a pair of parallel lines of different lengths located on the extensible collar so as to become progressively exposed for viewing from outside the compartment as the collar emerges from the compartment while being moved toward its final position, the full length of the shorter one of said lines being exposed when the collar is in its intermediate position and the full length of the longer one of said lines being exposed only when the collar attains its final position.

8. In a housing for an electric circuit interrupter: a pair of spaced sidewalls; relatively movable means disposed between said sidewalls for supporting an electric circuit interrupter; a racking mechanism for moving said supporting means between first and second preselected positions, said racking mechanism including a camming member that drives said supporting means and an actuating handle adapted to be coupled to the camming member for operation thereof; releasable stop means cooperating with said racking mechanism, the supporting means and a sidewall of the housing for physically blocking movement of the supporting means and for preventing operative coupling of said actuating handle to said camming member when said supporting means is in a predetermined one of said preselected positions, whereby the stop means must be released before the supporting means can be moved from said one position; and means for releasing said stop means.

9. Means for enclosing electric apparatus comprising: a relatively stationary housing including a movable inner part that reciprocates between a retracted position within the housing and an extended position partially without the housing, said housing further including an openable access cover attached to said inner part, whereby the cover travels with the inner part on movement thereof; means carried by said inner part for supporting electric apparatus; a racking mechanism for moving said inner part, said racking mechanism including a camming member for driving the inner part and an actuating member for operating the camming member; releasable stop means for physically blocking movement of said inner part and also for preventing operation of said camming member by said actuating member when said inner part is in its retracted and extended positions, whereby the stop means must be released before the inner part can be moved from either one of said positions; and means for releasing said stop means.

10. In switchgear apparatus: a metal-walled housing having an opening therein, the housing including a retractable inner part attached to a wall of the housing for telescopic movement through said opening so as partially to protrude without the housing, said inner part including means for supporting an electric circuit interrupter and having a metal access cover attached thereto for closing said opening; and a racking mechanism for moving said inner part, said racking mechanism comprising a pair of interengaging camming elements mounted for movement relative to each other on a wall of the housing and on the retractable inner part, respectively.

11. In an enclosure for an electric circuit breaker equipped with a movable switch member and a movable trip member: a relatively stationary compartment including a movable inner part and means for enabling said inner part to reciprocate between a retracted position within the compartment and an extended position partially without the compartment, the retracted and extended positions of the inner part being located respectively at opposite ends of its course of movement, said inner part including means for supporting the circuit breaker and having an openable access cover for the compartment attached thereto; a racking mechanism for driving said inner part between its retracted and extended positions, said racking mechanism being operated by an actuating member associated therewith; and interlock means, carried by said inner part where is cooperates with said racking mechanism and with the switch member of the circuit breaker, for disabling the racking mechanism, thereby preventing movement of said inner part, when the inner part is in either one of its retracted and extended positions and the circuit breaker is closed, and said interlock means also cooperating with the trip member of the circuit breaker for preventing closure of the circuit breaker whenever the racking mechanism is being operated.

12. Means for enclosing electric apparatus comprising: a housing including a movable inner part and means for enabling said inner part to reciprocate between a retracted position within the housing and a predetermined extended position partially without the housing, said housing further including an openable access cover attached to said inner part, said inner part including means for removably supporting electric apparatus; and means mounted in said housing for preventing initial installation of the electric apparatus whenever said inner part is in any position other than said extended position.

13. In a housing for an electric circuit breaker unit: a pair of spaced sidewalls; relatively movable means disposed between said sidewalls for removably supporting a circuit breaker unit; a racking mechanism associated with said supporting means for moving the supporting means between first and second preselected positions; a movable interference member mounted on one of said sidewalls; biasing means for urging said interference member to a normal position to prevent ingress of the circuit breaker unit; and means carried by said supporting means to move said interference member in opposition to said biasing means from its normal position to a position in which ingress of the circuit breaker unit is permitted whenever the supporting means is in a predetermined one of said preselected positions.

References Cited by the Examiner

UNITED STATES PATENTS 2,777,024   1/57   West _____ 200—50

FOREIGN PATENTS 931,152   9/47   France.

BERNARD A. GILHEANY, *Primary Examiner.*